(12) United States Patent
Appel et al.

(10) Patent No.: US 11,391,615 B2
(45) Date of Patent: Jul. 19, 2022

(54) FLUID FLOW PROBE AND ANALYSIS

(71) Applicant: Mobius Labs, Inc., Troy, NY (US)

(72) Inventors: Karl Appel, Troy, NY (US); Matthew Cusack, Troy, NY (US); Frank Lipowitz, Rexford, NY (US); John Gebbia, Lynbrook, NY (US); Trey Alexander Briccetti, Troy, NY (US); Devon Bernard, San Francisco, CA (US)

(73) Assignee: MOBIUS LABS, INC., Troy, NY (US)

( * ) Notice: Subject to any disclaimer, the term of this patent is extended or adjusted under 35 U.S.C. 154(b) by 0 days.

(21) Appl. No.: 16/893,930

(22) Filed: Jun. 5, 2020

(65) Prior Publication Data

US 2020/0386598 A1    Dec. 10, 2020

Related U.S. Application Data

(60) Provisional application No. 62/858,642, filed on Jun. 7, 2019.

(51) Int. Cl.
| | | |
|---|---|---|
| *G01F 15/063* | (2022.01) | |
| *G01M 3/26* | (2006.01) | |
| *G06Q 10/00* | (2012.01) | |
| *G06Q 50/06* | (2012.01) | |
| *G06Q 50/26* | (2012.01) | |
| *G06Q 50/16* | (2012.01) | |

(52) U.S. Cl.
CPC .......... *G01F 15/063* (2013.01); *G01M 3/26* (2013.01); *G06Q 10/20* (2013.01); *G06Q 50/06* (2013.01); *G06Q 50/163* (2013.01); *G06Q 50/26* (2013.01)

(58) Field of Classification Search
CPC ...... G01F 15/063; G01F 15/007; G01M 3/26; G01M 3/3254; G06Q 50/06; G06Q 50/26; G06Q 50/163; G06Q 10/20
See application file for complete search history.

(56) References Cited

U.S. PATENT DOCUMENTS

| | | |
|---|---|---|
| 4,916,762 A | 4/1990 | Shaw |
| 5,419,189 A | 5/1995 | Lew et al. |
| 6,877,170 B1 | 4/2005 | Quintana et al. |

(Continued)

OTHER PUBLICATIONS

Non Final Office Action dated Feb. 21, 2019 for U.S. Appl. No. 15/417,754, filed Jan. 27, 2017; pp. 14.

(Continued)

*Primary Examiner* — Michael J Dalbo
(74) *Attorney, Agent, or Firm* — Hoffman Warnick LLC

(57) ABSTRACT

A computing system having a memory and a processor configured to process flow data packets (FDPs) collected from a set of sensor devices, each installed in a toilet that collects a flow data packet (FDP) in response to a detected event, wherein each FDP includes a sequence of flow rate values collected over the course of the detected event. The processor is configured to: issue a first type of alert in response to a number of flow rate values in a current FDP being above a threshold; issue a second type of alert in response to a detected abnormal behavior of the current FDP relative to previously collected FDPs for an associated toilet; and issue a third type of alert based on a water usage for the toilet, wherein the water usage is based on calculated flow rate for a toilet determined from at least one FDP.

20 Claims, 9 Drawing Sheets

(56) References Cited

U.S. PATENT DOCUMENTS

| | | | |
|---|---|---|---|
| 7,743,436 B1 | | 6/2010 | Schuster et al. |
| 9,928,724 B2 | * | 3/2018 | Alcorn .................. G08B 21/20 |
| 10,526,771 B1 | * | 1/2020 | Devereaux .............. E03B 7/071 |
| 2003/0145371 A1 | | 8/2003 | Ghertner et al. |
| 2004/0199989 A1 | | 10/2004 | Trolio |
| 2007/0125429 A1 | | 6/2007 | Kandl |
| 2008/0141447 A1 | | 6/2008 | Bowcutt et al. |
| 2010/0000013 A1 | | 1/2010 | Williams |
| 2013/0124113 A1 | | 5/2013 | van Dal |
| 2015/0059074 A1 | | 3/2015 | Davies |
| 2015/0089730 A1 | * | 4/2015 | Bekki ....................... E03D 1/14 4/314 |
| 2015/0168188 A1 | | 6/2015 | Reichart et al. |
| 2016/0027278 A1 | * | 1/2016 | Mcintosh ........... G08B 21/0423 715/741 |
| 2016/0097665 A1 | | 4/2016 | Becerra et al. |
| 2016/0265208 A1 | * | 9/2016 | Brackett, Sr .............. E03D 1/00 |
| 2017/0212533 A1 | * | 7/2017 | Brody ..................... G01F 15/18 |
| 2018/0067011 A1 | * | 3/2018 | Yung ........................ G01M 3/28 |
| 2018/0216742 A1 | * | 8/2018 | Korten ............... G05D 16/0636 |

OTHER PUBLICATIONS

Final Office Action dated Jul. 25, 2019 for U.S. Appl. No. 15/417,754, filed Jan. 27, 2017; pp. 30.
Non Final Office Action dated Feb. 7, 2020 for U.S. Appl. No. 15/417,754, filed Jan. 27, 2017; pp. 24.
Notice of Allowance and Fee(s) Due dated Apr. 30, 2020 for U.S. Appl. No. 15/417,754, filed Jan. 27, 2017; pp. 21.

* cited by examiner

FLUID FLOW PROBE AND ANALYSIS

TECHNICAL FIELD

The subject matter of this invention relates to analyzing fluid flow events and more particularly to a system and method of analyzing fluid flow events in a toilet tank.

BACKGROUND

As water resources become more scarce and expensive, water management in large facilities such as apartments, hotels, etc., will continue to become more and more important. Among the challenges facility owners and managers face is to ensure that water waste is minimized.

Although this software is a platform and applies to all building plumbing and fixtures, one area where water waste is commonplace involves leaking bathroom appliances such as toilets. A simple slow leak may go undetected for some time but water fixtures such as the toilet will continue to operate, but will repeatedly discharge water as though it was partially flushed.

While systems exist to look for leaks and the like at the fixture level, analysis on a macro level (e.g., within a hotel) is currently not possible.

SUMMARY

Aspects of the disclosure provide a platform for analyzing and leveraging data collected from a cohort of a fluid flow sensors. For each detected event (e.g., a flush, a leak, etc.) a flow data packet (FDP) is collected that includes a sequence of flow rate values. The FDP can be analyzed against existing signatures to, e.g., identify or predict behaviors and failures. Further, the FDP's can be utilized to calculate a flow rate (GPM) through the toilet, total gallons used, and a relative pressure of the water flowing through the toilet. Relative pressures, volume used, flow rates and temperatures from different toilets collected over time can be analyzed to, e.g., provide nodal analytics, inter-nodal analysis, and give macro-level analysis of an entire building or system.

A first aspect provides a computing system having a memory and a processor configured to process flow data packets (FDPs) collected from a set of sensor devices, each installed in a toilet that collects a flow data packet (FDP) in response to a detected event, wherein each FDP includes a sequence of flow rate values collected over the course of the detected event. The processor is configured to: issue a first type of alert in response to a number of flow rate values in a current FDP being above a threshold; issue a second type of alert in response to a detected abnormal behavior of the current FDP relative to previously collected FDPs for an associated toilet; and issue a third type of alert based on a water usage for the toilet, wherein the water usage is based on calculated flow rate for a toilet determined from at least one FDP.

A second aspect provides a system, comprising a set of sensor devices, each installed in an associated toilet that collect a flow data packet (FDP) in response to a detected event, wherein each FDP includes a sequence of flow rate values collected over the course of the detected event; and a computing system that includes a memory and a processor configured to process flow data packets (FDPs) collected from the sensor devices, wherein the processor is configured to: issue a first type of alert in response to a number of flow rate values in a current FDP being above a threshold; issue a second type of alert in response to a detected abnormal behavior of the current FDP relative to previously collected FDPs for an associated toilet; and issue a third type of alert based on a water usage for the toilet, wherein the water usage is based on calculated flow rate for a toilet determined from at least one FDP.

BRIEF DESCRIPTION OF THE DRAWINGS

These and other features of this invention will be more readily understood from the following detailed description of the various aspects of the invention taken in conjunction with the accompanying drawings in which.

Figure 1:
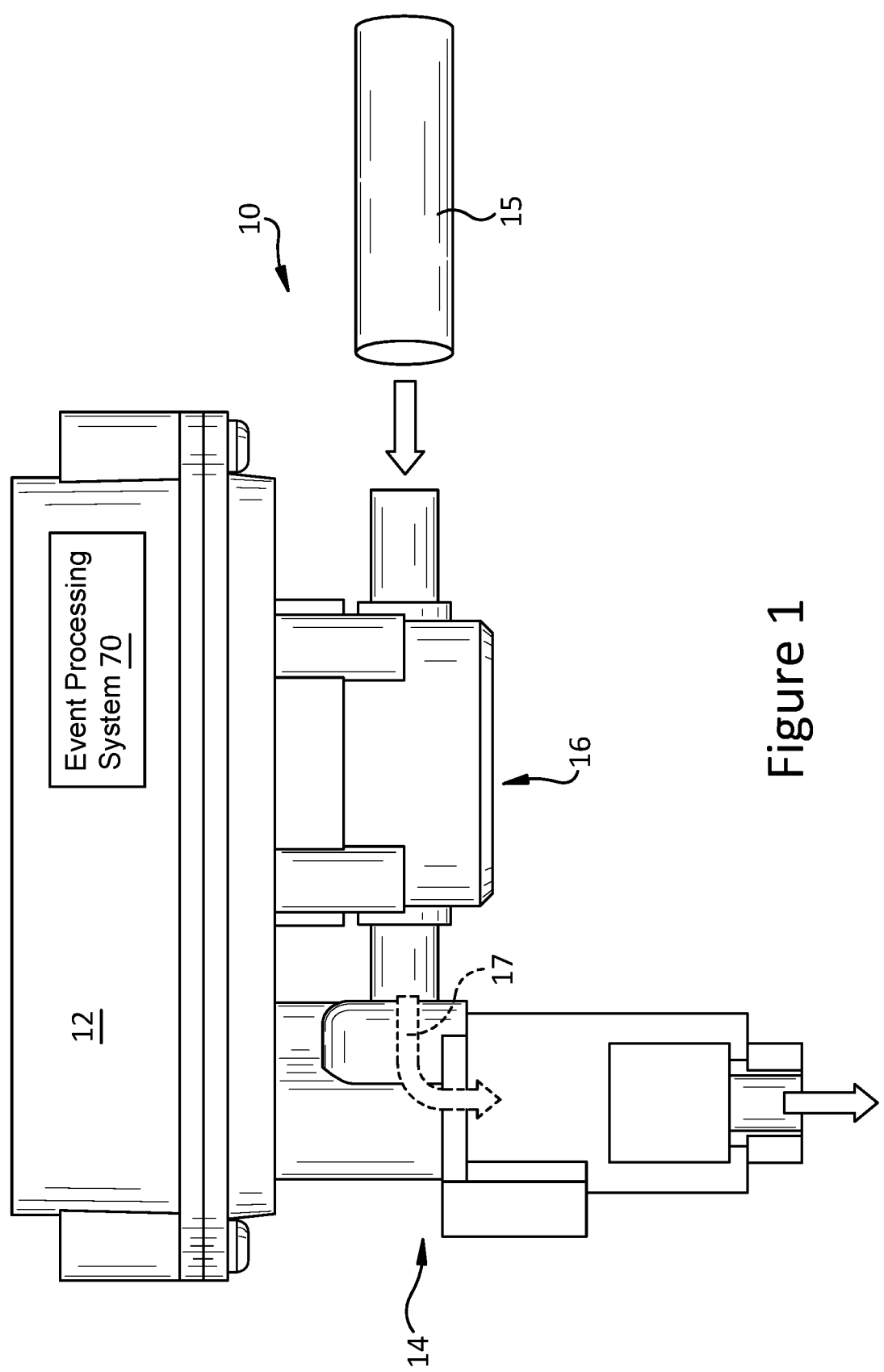
FIG. 1 shows a flow sensor according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments disclose a platform for analyzing and leveraging data collected from a cohort of a fluid flow sensors. In the described embodiments, the fluid flow sensors comprise sensors installed in a set of toilet tanks. However, it is understood that the invention could be applied to any system of devices within which water flow data can be captured.

An illustrative fluid flow sensor ("FFS") 10 is shown in FIG. 1, and is also described in US patent application Enhanced Fluid Flow Sensor System, filed on Feb. 25, 2019, Ser. No. 16/284,584, the contents of which are hereby incorporated by reference. FFS 10 measures flow data passing through the fill tube 15 of a toilet when a flow event occurs (e.g., the toilet is flushed, a leak occurs, etc.). The FFS 10 comprises a self-contained unit that generally includes: (1) a housing 12 that contains an event processing system 70 and an associated power source (not shown); (2) a flow sensor 16 that collects flow data between an inlet and outlet; (3) a universal stem 14 for mounting the FFS 10 onto different types of toilet overflow tubes and discharging water flow therein; and (4) a probe embedded in stem 14 that detects a water flow event during a sleep mode and activates a data collection mode within the event processing system 70.

As shown by the arrows in FIG. 1, during a flush event, water flows through flexible fill tube 15, through water flow sensor 16, down through the universal stem 14, and out to an overflow tube (not shown). Along the way, internal probes located proximate arrow 17 detect the event and activate the data collection mode of the event processing system 70 located in the housing 12.

Water flow sensor 16 may for example comprise a Hall Effect sensor, single winding of a generator, or any mechanism that can infer flow rate from electrical generation having an internal turbine or the like that rotates in response to a flow of water and emits pulses or ticks in response to a flow rate. Namely, the greater the flow rate, the greater the frequency of pulses (also referred to herein as ticks). Event processing system 70 is configured to count and capture a number of pulses in a Flow Data Packet (FDP) at predefined time intervals during the water flow event. For example, event processing system 70 may capture a pulse value every two seconds during a flow event (e.g., a flush). For example, an FDP may contain 30 data values, collected every two seconds over a 60 second time period. The resulting FDP contains a sequence of flow rate values for a given flow event, e.g., t1=200, t2=190, t3=190, t4=200, t5=201, t6=108 . . . t30=107. Each value within the sequence may for example represent the number of times a turbine spun during a two second interval.

At a predetermine time thereafter, FDPs are wirelessly transmitted to a remote data processing service for analysis in a communication mode. Transmission may occur at the time of the event, or any time thereafter. In one illustrative embodiment, a collection of event data records are transmitted in a batch mode at predefined time intervals, e.g., every 8 hours. Alternatively, some or all of the analysis may take place at the sensor 16.

Accordingly, a sequence of data is collected during each event e.g., during a flush, a flapper failure, etc. The number of values in an FDP will depend on the length of the event and therefore may be any length. In one embodiment, the FDP comprises a minimum of 60 seconds worth of data that includes 30 data points. However, if the event is less than 60 seconds, some of the values in the FDP will be zero. Further, some events may extend beyond 60 seconds, so FDPs are configured to contain a greater number of data points. In one embodiment, if an event extends beyond 60 seconds, a series of sub-FDPs each containing a fixed number of values may be utilized, e.g., FDP=$FDP_1$+$FDP_2$+$FDP_3$ to collect the entire event, in which each sub-FDP contains, e.g., 30 data values or 60 seconds of data. Note that other packet sizes and collection intervals may be utilized (e.g., values may be collected every 3 seconds in a two minute FDP). By collecting a data sequence for an event, as opposed to a single value (e.g., elapsed time), events can be much better analyzed and characterized.

Figure 2:
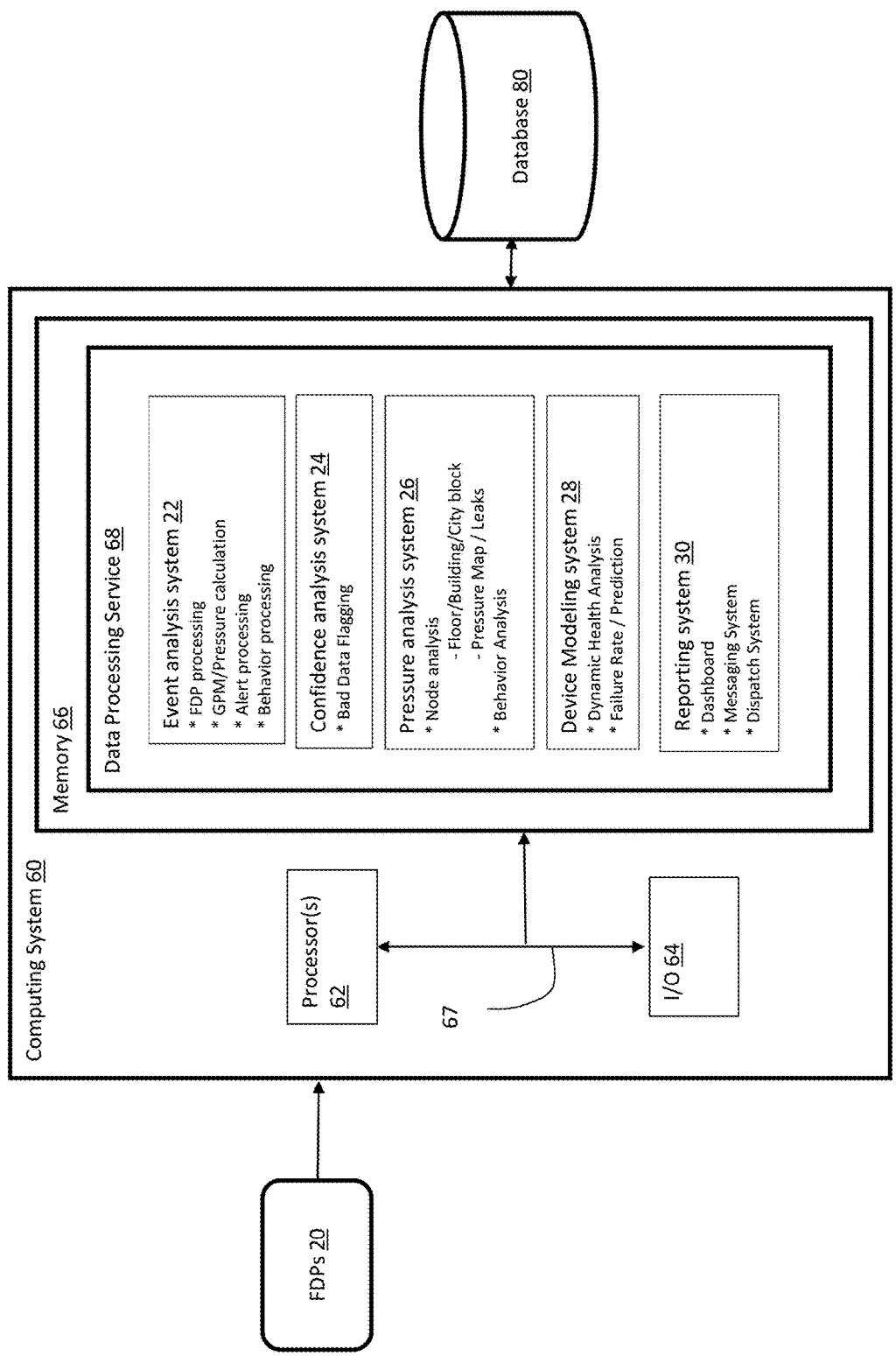
FIG. 2 shows a data processing system according to embodiments.

FIG. 2 depicts an illustrative data processing service 68 that collects and processes FDP's 20 from a set of installed sensors. Data processing service 68 generally includes an event analysis system 22, a confidence analysis system 24, a pressure analysis system 26, a device modeling system 28 and a reporting system 30.

Event analysis system 22 processes individual events as captured in an FDP 20, including storing and analyzing the event, e.g., relative to threshold values, rules, signatures, etc., and determines if an alert needs to be generated.

In one embodiment, when an event occurs, a flow rate, e.g., gallons per minute (GPM), and total gallons used by the toilet are calculated based on the flow information collected in the FDP 20. In this embodiment, GPM of water being used by a toilet is extrapolated based on collected data of water passing through the overflow tube. Namely, by utilizing time T required for a flush event and the volume V of the toilet, a toilet flow rate $R_t$ can be determined by the formula $R_t$=V/T. If the volume V of a toilet tank is 1.6 gallons, and time T a flush is 30 seconds, or half a minute, the toilet flow rate $R_t$=1.6 G/0.5 min=3.2 GPM.

Initially, a calibration is performed for each toilet during installation to get the baseline toilet flow rate, e.g., $R_t$=3.2 GPM. The baseline flow rate going through the overflow tube $R_o$ can also be measure by the device. Thus, if the baseline flow rate measured by the sensor via the overflow tube is 0.25 GPM, then the ratio $R_o/R_t$=0.25/3.2 can be used evaluate future water flow changes. Namely, $R_o$ is determined from the sensor measuring flow rate of the overflow tube during any future event, so the current GPM for the toilet $R_t$ can be recalculated for each event. So if the GPM going through the overflow tube is 0.30 GPM during a subsequent event, then flow rate for the toilet is $R_t$=3.84 GPM; i.e., 0.25/3.2=0.30/Y. This value can also be used to determine the total gallons used during the event by the toilet based on how long the event lasted, which is determined, e.g., by multiplying the number of non-zero values in the FDP 20 by two seconds. E.g., if the event lasted for one minute, then it is known that 3.84 gallons were used.

This above analysis is also useful for measuring water usage when flow rates are not fixed, such as when the water system in a building changes due to changes in occupancy or during a continuous flow event, where the toilet does not stop running for long periods of time. This information can be used for predictions and changes that may occur with the total volume being used by a particular flush.

In a further embodiment, relative pressure can also be calculated when one or more new events are detected. Calculating relative pressure may be done as described herein, and likewise be utilized to generate or manage alerts, provide predictions, modeling, etc. In one embodiment, relative pressure can be utilized as a calibration or check against other factors for analyzing performance or generating alerts. For example, if the GPM for a toilet is higher than expected, the relative pressure of the toilet or group of toilets (e.g., on a hotel floor) can be analyzed to see if the higher GPM is within an acceptable boundary based on a temporary increase in relative pressure.

Alerts can be generated for various reasons, including any of the following. A first type of alert can be generated if the size of the FDP 20 was greater than a predetermined or dynamically set threshold, indicating that the event was longer than defined time threshold (e.g., 10 minutes). For example, if the FDP 20 had 300 values, collected at two second intervals, that would indicate that the event lasted 10 minutes.

Figure 9:
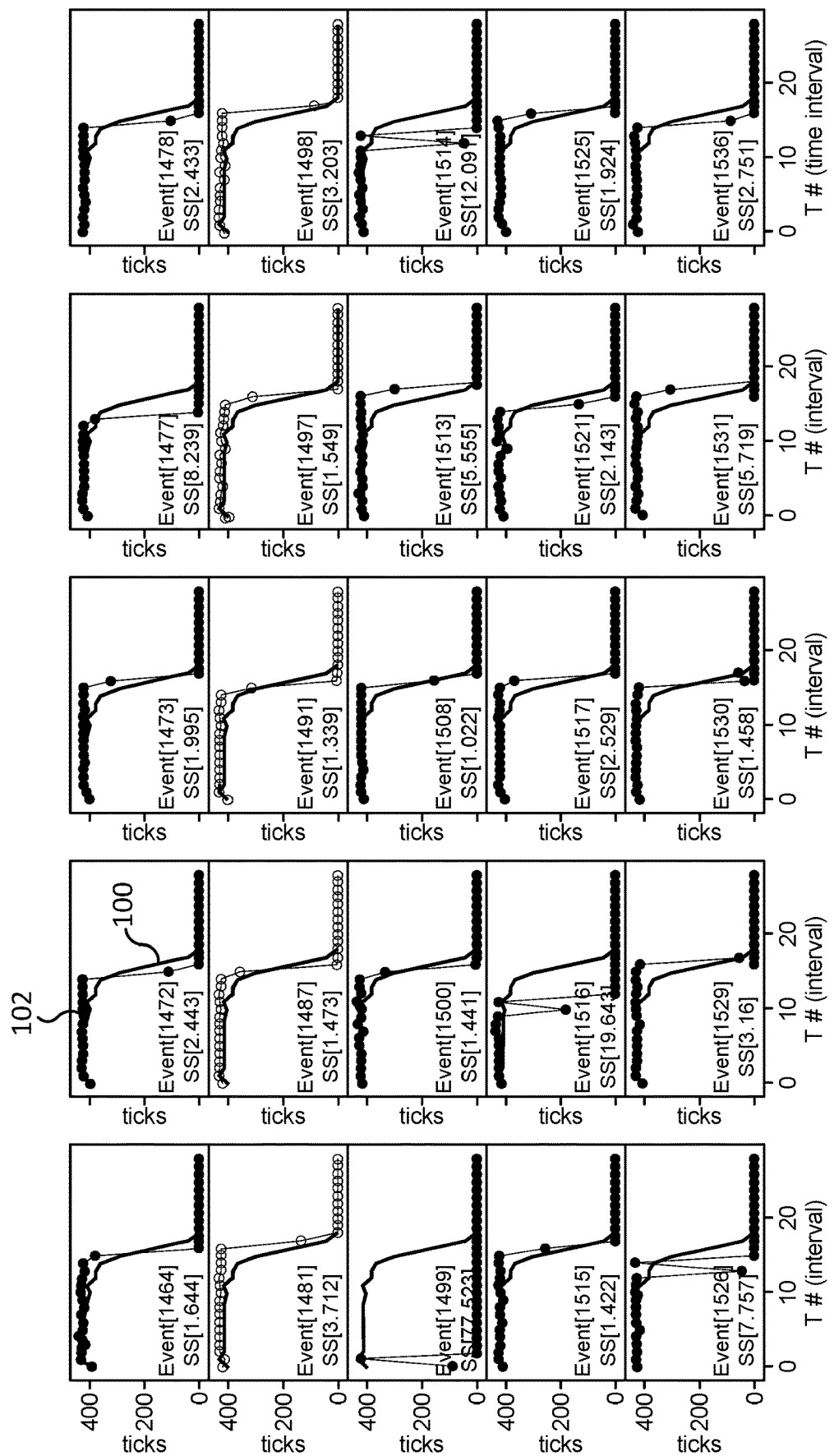
FIG. 9 shows a series of flush event waveforms according to embodiments.

A second type of alert can be generated if an abnormal behavior is detected for one or more events. Abnormal behaviors can be determined using a hard coded or dynamically set of rules, e.g., issue an alert if five consecutive flushes of 10 seconds or less are detected; or can be determined based on dynamic modeling as provided by device modeling system 28. In one illustrative approach, dynamic modeling automatically calculates a "healthy benchmark" or signature for a given toilet in an ongoing fashion. For example, a healthy benchmark may be determined based on flush events collected of over a past number of days (e.g., the past seven days). The past flush events may for example be modeled as an average or typical behavior, e.g., a flush on average lasted 45 seconds, with a GPM of 3.1. Incoming data is compared to this benchmark, and alerts are raised by identifying statistical outliers at various levels of severity. In another approach, a curve capturing expected behavior of data in the FDP 20 is utilized to evaluate new events. An example of this is shown in FIG. 9 in which FDP data 102 for newly collected events are compared to a healthy curve 100. If the data 102 deviates significantly from the healthy curve 100 an alert can be issued. Abnormal behavior can for example be detected using the sum of squares between the observed data 102 and the standard flush profile (curve 100) for a particular device. Alerts may be generated when a threshold number of recorded flush events are detected that are statistical outliers from the normal interquartile range of the benchmark profile. In this case, the curve 100 can be regenerated each day based on FDP collected in the previous seven days (or some other rolling window). These dynamic approaches in which a healthy benchmark is continuously recalculated provide a more accurate representation of an individual device's behavior, as each device's historical data is used to determine its alert thresholds.

Figure 4:
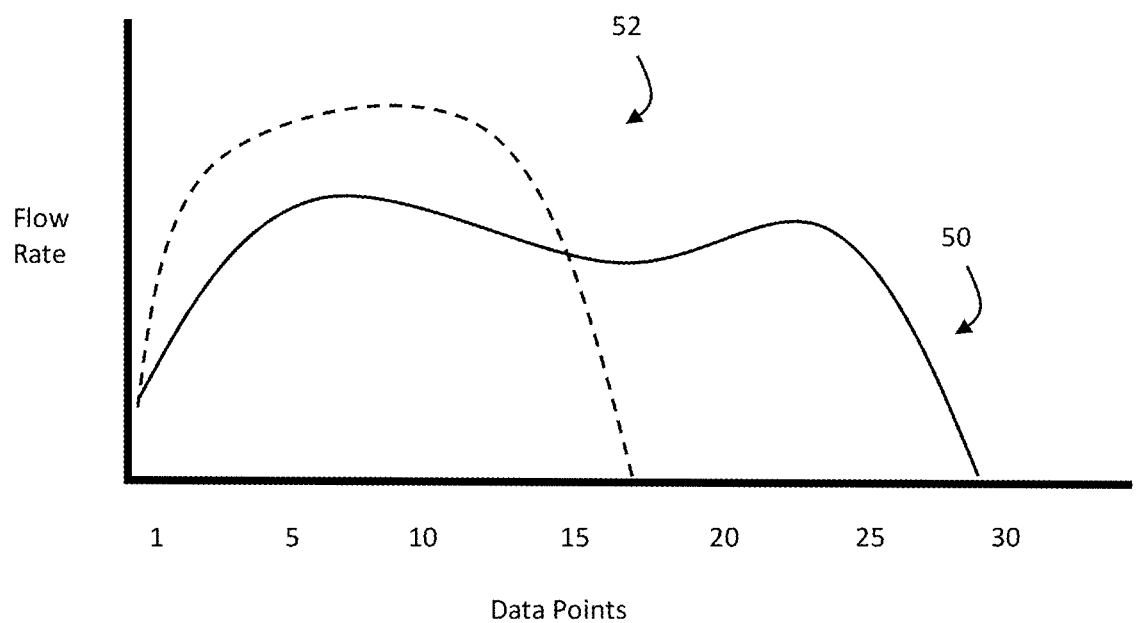
FIG. 4 shows an event curve and signature curve according to embodiments.

FIG. 4 shows an event curve 50 from a collected FDP that defines the signature of the event. Also shown is an expected or ideal or healthy benchmark curve 52. As can be seen, the ideal curve 52 shows that the event should be completed by about the $17^{th}$ data point in the FDP (i.e., 34 seconds on a two second sub-interval) at a relatively uniform flow rate (i.e., pressure) or varying flow rate (and pressure) profile. However, in this example, the collected event curve 50 required about 29 data points to complete (i.e., 58 seconds) over a relatively lower pressure and flow rate. Each collected event curve 50 can be analyzed against predetermined signature curves to determine if an issue exists, and what type of issue exists. For example, in a simple case, events taking shorter or longer than a threshold number of data points to complete may indicate a slow leak, a difference in location caused by horizontal distance differences (i.e. the floor) or vertical distances (the relative distance from the "header" pipe or main line. Both of these are useful insights to locate relative position for analysis, determination of a problem or not, and confirmation of expected outcome due to prior knowledge of the piping diagram. Other event curves may indicate a clog, worn out parts, a bad flapper, etc. Further, it may be known that during certain times of the day, or during a water or sewer delivery system fault that the water pressure and flow rate may be lower or higher resulting in a longer or shorter event. External factors can be confirmed or refuted by comparing relative changes in measurements within a specific location, building, floor, or part of a floor. Thus, there may be a periodic expected change, such as a "morning ideal curve" that is different from the "afternoon ideal curve". Further, the performance of individual toilets can be collected over time and stored in database 80. Toilet performance data can be clustered, e.g., based on behavior, location, time of day, knowledge of internal or external events, fixture model, combination of elements in a fixture, etc.

Figure 8:
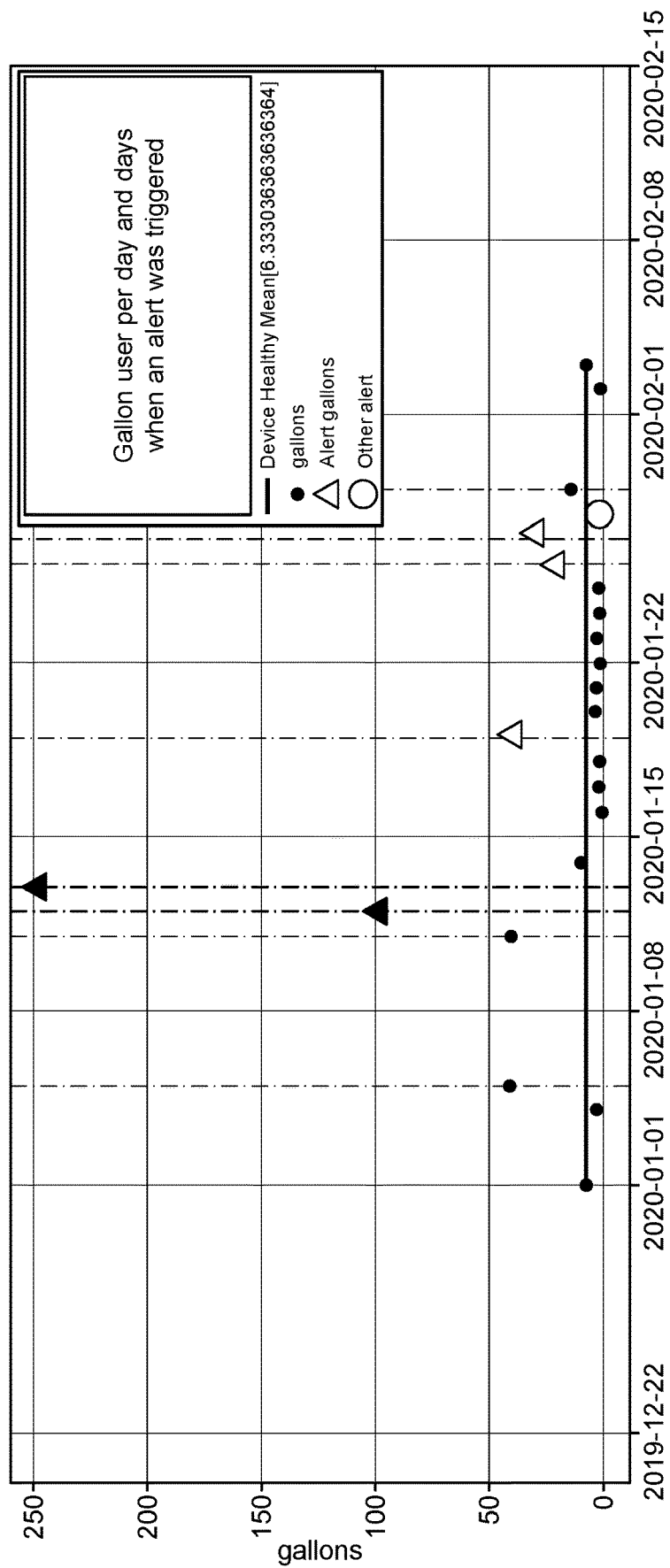
FIG. 8 shows an abnormal behavior alert graph according to embodiments.

A third type of alert can be generated based on a total gallons used by a toilet in a given day. An example of this is shown in FIG. 8, in which the total daily gallons for a device are shown. In this case, the darkened triangles represent days when a high alert was raised due the an unexpectedly high usage of water, e.g., 100 and 250 gallons. The un-darkened triangles represent low level alerts issued based on water usage. Note that the horizontal line represents a healthy mean of water used. Also note that an alert was not always generated when the value was above the mean. In this case, issuance of a low level alert was due to some other factor or set of factors, e.g., a combination of gallons used, frequency of use, and/or expected behavior in view of recent activity. Further, other alerts not related to gallons used shown by the circle are also reported. Gallons used during a flush are determined based on the GPM of the toilet multiplied by the length of the event. The GPM of the toilet ($R_T$) is determined as described above. The length of the event is determined based on the number of values in the FDP.

Confidence analysis system 24 (FIG. 2) can be utilized to identify and remove bad data. For example, assuming thirty data points are collected every sixty seconds, there are enough points to infer the reliability of the data and the fixture. For instance, each two-second data point in an FDP 20 can be compared to the others in the event, a rolling average, and/or historical data to identify outliers that need to be addressed. For example, a flush may be interrupted by a second flush, or there may be an inadvertent jiggle of the handle, etc. Such outlier data can be spotted by analyzing the event curve and then removing it as bad data. Filtering the bad data in this manner improves the data processing results.

A fourth type of alert may be generated if a fault or tampering of the device is detected. For instance, if someone went into the tank and repeatedly pushed the reset button, a tampering based alert can be detected and issued. Likewise, if the sensor failed to report in after a predetermined time period a fault based alert could be issued.

A further type of analysis that may be provide involves pressure analysis system 26 (FIG. 2). Pressure analysis system 26 can be utilized to analyze and map water pressure associated with the toilet or across a larger set of toilets (or "nodes"). One particular type of information that may be determined from FDP's is "relative pressure." As is understood, pressure P is proportional to the square of flow rate Q, according the formula:

$$Q^2 \sim P$$

Accordingly, by knowing the flow rate (i.e., RPMS) at discrete or averaged smaller, e.g., two to five second data points, a relative pressure and pressure profile can be inferred. Thus, for example, if the average flow rate for an event or set of events at two toilets T1 and T2 are 100 and 225, respectively, then a relative pressure $P_R$ can be inferred as: $P_R$ (T1)=10 and $P_R$ (T2)=15. In other words, the water pressure at T2 is 50% greater than the water pressure at T1 with a corresponding increase in flow rate Q.

In cases where a system is tracking a large number of toilets (e.g., toilets in a hotel) or in multiple buildings (e.g., toilets in a city block, toilets located within a particular geolocation, toilets of similar or different manufacturers in any location), relative pressure and flow rate measurements can be used for various types of detailed analytics, e.g., fault profiling, reliability metrics, reliable assembly combinations, leaky pipe detections, failure predictions, severity predictions, urgency predictions, etc.

Figure 5:
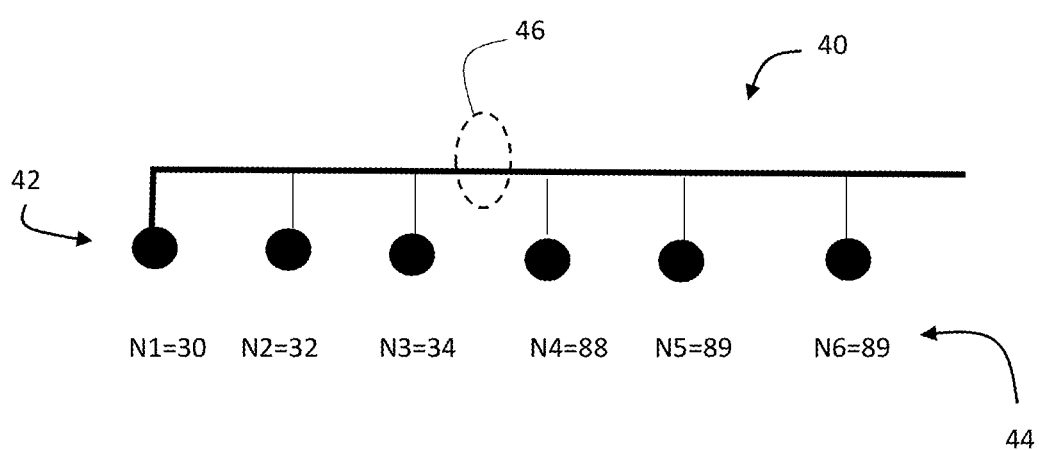
FIG. 5 shows a plumbing/pressure map according to embodiments according to embodiments.

For example, data collected from multiple nodes allows relative pressure to be evaluated on a macro or inter-nodal level, e.g., across an entire building, across a floor, relative to the main line, etc. Relative pressures can be analyzed to understand event behavior on a much more precise level, e.g., flush signatures on the $30^{th}$ floor of a hotel may look much different than signatures on a second floor. Analyzing parameters, such as pressure and flow rate anomalies, along with plumbing maps of a building allows for the ability to perceive the status of plumbing behind walls, including the detection of leaks in between nodes. For example, if the relative pressure at multiple similar toilets on the same floor or branch of a hotel differs, i.e., demonstrating differences in the kinematic parameters, then the location of a potential problem such as a leak or blockage in between two nodes may be determined. A simple example of this analysis is shown in FIG. 5, in which a piping map 40 shows six nodes 42 (i.e., toilets N1, N2, N3 . . . N6) sourced from a common water feed. The relative pressure 44 of each node is also shown (N1=30, N2=32, etc.). As can be seen, a significant pressure drop occurs between nodes N3 and N4. This pressure, flow rate, or duration changes may indicate a leak at area 46 in the feed line behind a wall. Corrective action can be taken before continued loss of the fluid continues or a catastrophic event occurs.

In one embodiment, flow data is collected at two second intervals (i.e., n=2) by the sensor 10. However, it is understood that other intervals, e.g., n=3, 4, 5, . . . seconds could be utilized to accomplish the same goal. The interval of n=2 sec gives a high level of granularity of the data and the high number of data points, which improves statistical analysis.

Figure 7:
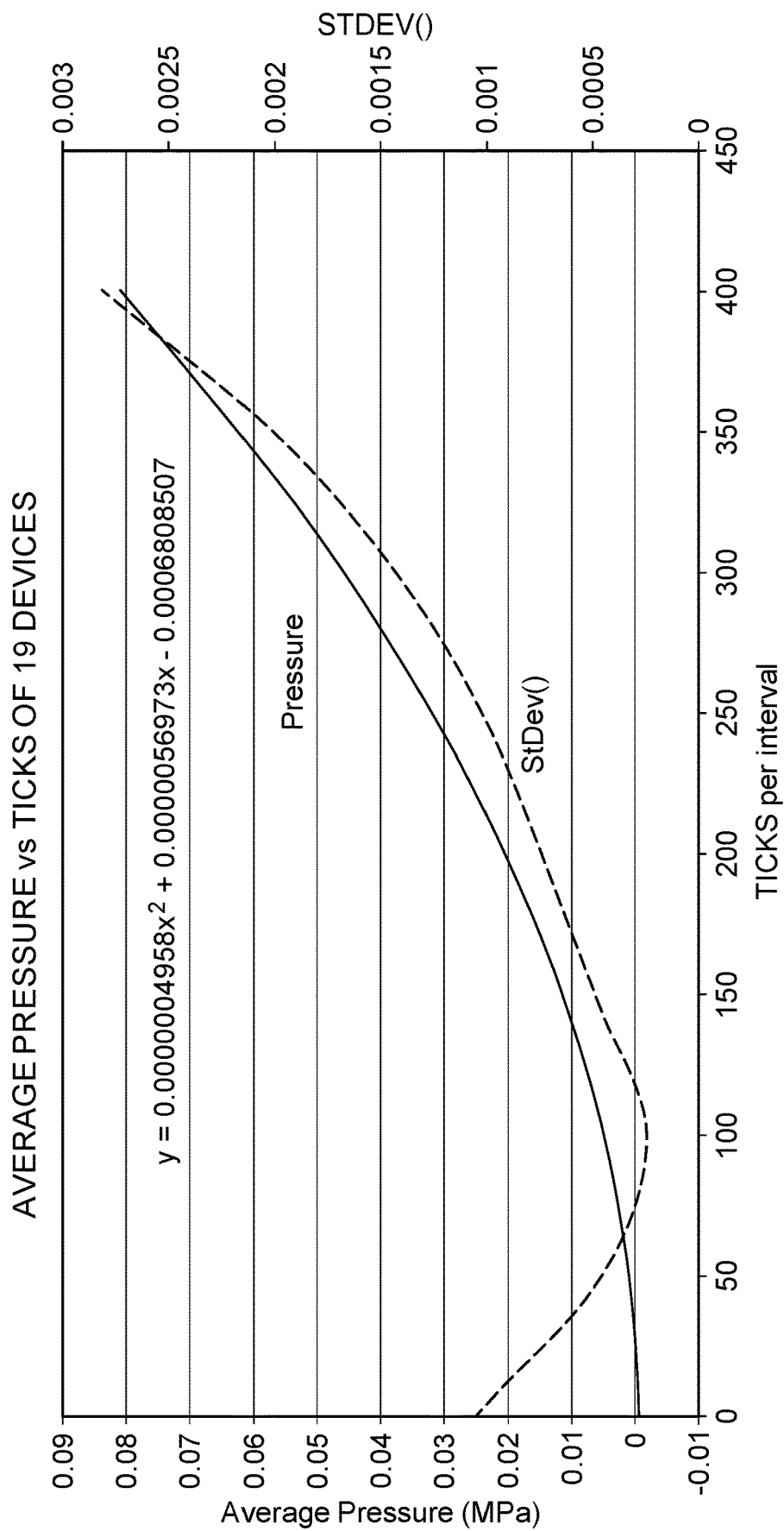
FIG. 7 shows a pressure analysis graph according to embodiments.

The pressure data can be used for multiple purposes. The sensor 10 has been proven to reliably measure the pressure in the water system piping coming into the water fixture. The graph shown in FIG. 7 shows a summary of a 20-device test for the reliability of the pressure data. As shown, the standard deviation closely tracks the calculated pressure, indicating that the use of FDPs 20 to provide pressure data is accurate.

Examples of how pressure data can be utilizes to manage water usage include:
  Produce a "heat map" of the water pressure in the building. This is useful in a holistic picture of the facility for a wide number of uses.
  Predict failures that happen more frequently with time. Pressure variations and high-pressure are known anecdotally to cause more problems with water fixtures.
  Find potential leaks in piping. Use the data from individual rooms and treat them as a 3-dimensional grid of data points. Any one pressure variation can be looked at relative to the entire data set or part of the data set.
  Find potential leaks related to several rooms. Use the data from individual rooms and treat them as a grid of data points. When you do this for every floor, each room that creates an alert can be checked against adjacent and non-adjacent rooms in both the vertical and horizontal directions.

In addition to the above, device modeling system 28 (FIG. 2) may be employed to analyze different toilet model performance over time to ascertain failure rates and predictions for combinations of hardware, location, configuration of plumbing, etc. For example, based on collected data in database 80, it can be determined that Toilet Model A tends to fail sooner after installation when subjected to higher pressure or higher flowrate (lower hotel floors). Conversely, Toilet Model B may tend to show fewer failures over long periods of time regardless of the floor. For instance, changes in the event signature curve of a given device/model may be predictive of an indicated performance breakdown that will soon result in a failure.

Data modeling system 28 analyzes different types of leaks and the severity of a leak with time series data. Namely, the difference in flow rate and/or pressure is monitored as time progresses to predict both when a leak will occur and how bad the leak will be when it does occur. Some of the data sources that can be used include occupancy rates (e.g., of a hotel room), piping or mapping data, previously detected problems from other rooms, flow rates, water pressures, times of day, and data from other aspects of the systems. This historical data can be used to forecast how a leak will progress along a water usage curve.

In one example, long-term trends aggregated across buildings and granular trends at the device and point-of-use level are modeled. These include:
  Devices with repetitive abnormal behavior.
  Deviations from healthy levels of usage and other aggregated metrics across buildings.
  Dynamic systems to alert statistical outliers within individual device behaviors. An example of this in shown in FIG. 8, in which dynamic detection of device abnormal behavior is shown. In this case, two low severity alerts are raised prior to a critical level problem.
  Granular analysis of individual flush events. An example of this is shown in FIG. 9 in which waveforms of individual flush events are depicted. Abnormal behavior is detected as sum of squares between the observed data and the standard flush profile (smooth curve) for a particular device.
  Probability models for alerts of particular buildings and devices.

Finally, data processing service 68 may include a reporting system 30, that for example includes a dashboard (e.g., showing health of a building, floor, room, toilet, urgency, loss rate, alerts, etc.); a messaging system that generates alerts with a method to indicate priority or urgency or the like when an issue is detected, and a dispatch system that automatically contacts a maintenance personnel if an issue is detected.

Alert system may generate alerts that identify specific problems within a fixture, individual fixtures themselves, an aggregation of fixtures, similar fixtures across buildings or within a building, parts of a floor or different floors, etc. Fixture level alerts may include:
  Different types of alerts.
  A specified urgency.
  Natural language associated with the alert criteria. For example, an alert signature for a specific repair can include a repair note or relevant details in natural language.
  Dynamic alert strategy, in which the alerts are unique to each device, or device type.
  Device tampering warnings.
  Battery state.
  Signal strength.
  Integration of data from multiple fixtures. These can be in the same building, nearby vertically or horizontally, or in different buildings that are using identical fixtures.
  Check rooms next door during a sudden large alert.
  Similar alert trends in identical fixtures.

Figure 3:
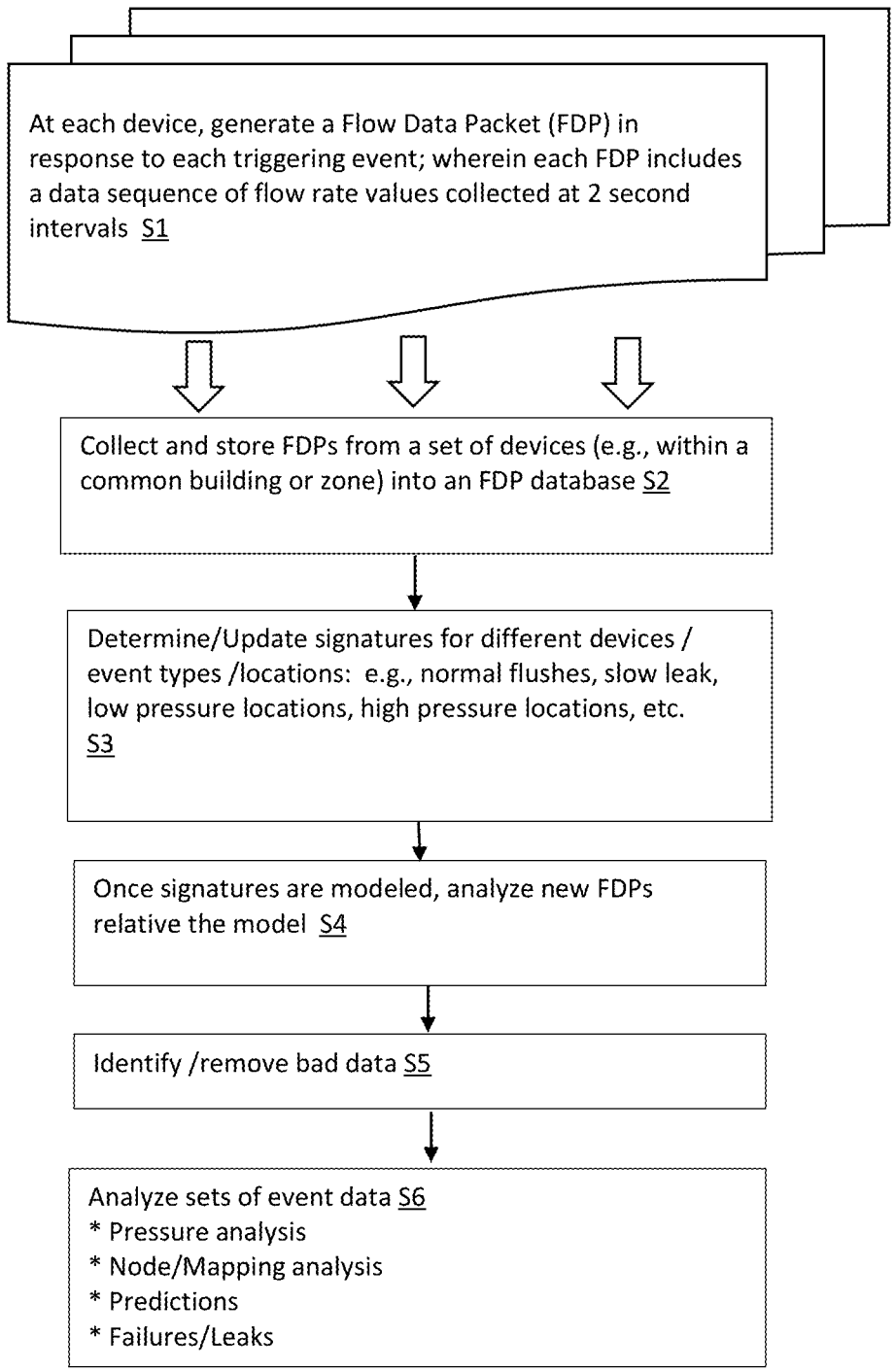
FIG. 3 shows a flow diagram of a data analysis process according to embodiments.

FIG. 3 depicts an illustrative analysis process. At S1, FDPs are generated at devices installed in toilets (e.g., within a common building). At S2, a data processing service 70 collects and stores FDPs from the devices. At S3, ideal signatures from different devices, event types, locations, etc., are determined (or updated) as new data arrives. Machine learning, natural language processing, any other artificial intelligence or any other domain discretizing technique (finite element, finite difference, etc.) may be employed to create and model ideal signatures and behaviors. Once signatures are modeled, newly generated FDPs are analyzed relative to the ideal signatures/data models at S4. At S5, bad data (i.e., outliers) are identified and removed, and at S6, collected FDP data is analyzed, e.g., to identify failures/leaks, to provide pressure analysis, node/mapping analysis, predictions, etc.

Figure 6:
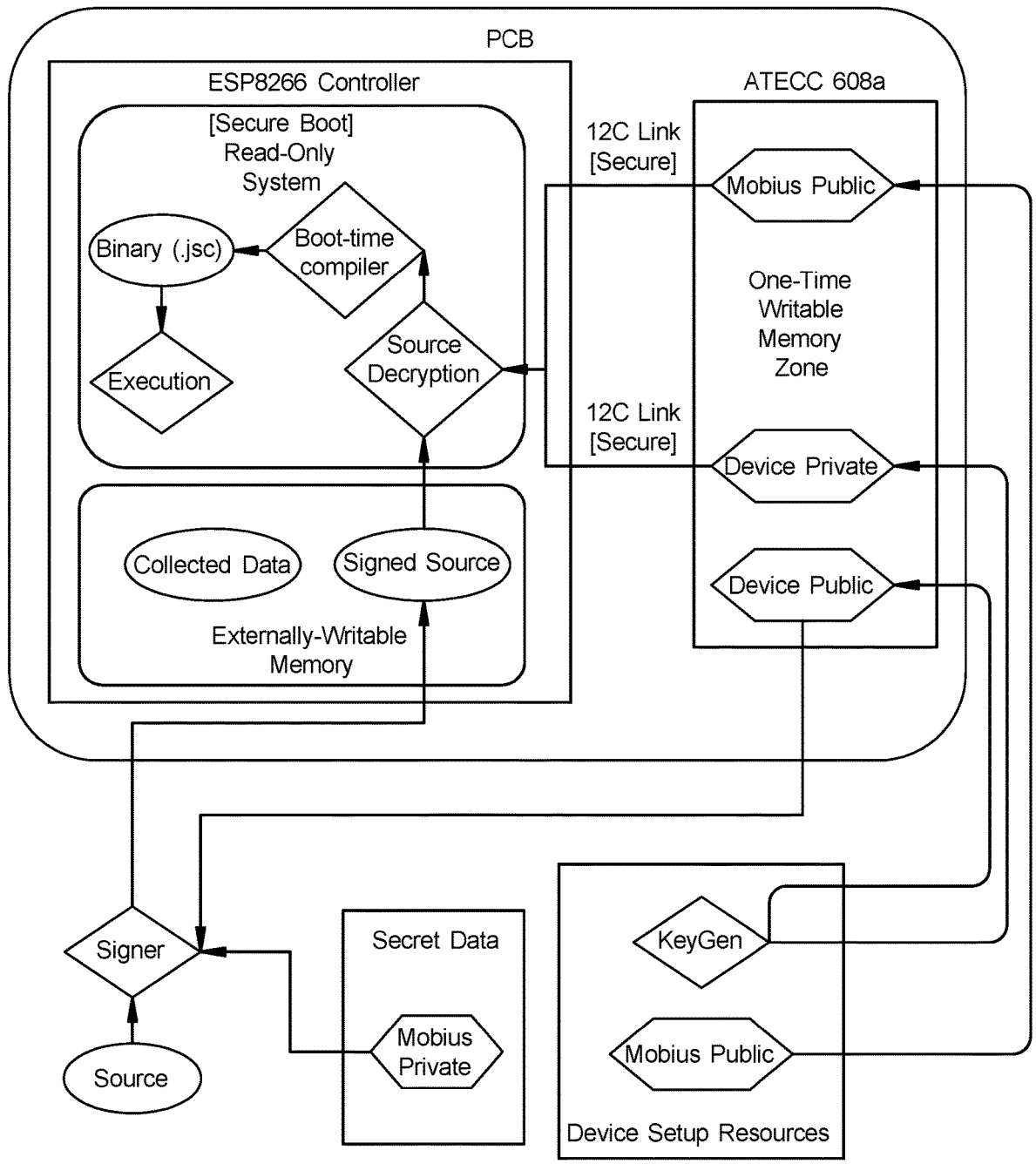
FIG. 6 shows a system level diagram of a fluid flow sensor device according to embodiments.

FIG. 6 shows a system level diagram of a fluid flow sensor device. The benefits of this are (1) it allows code to be securely changed on the device without having to re-flash the operating system, and (2) it protects the device from executing unauthorized code in its writable memory space.

It is understood that data processing service 68 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), Bluetooth, Zigby, Z-Wave, 3.5 Ghz Band, LoRa, 4G, 5G, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 60 that may comprise any type of computing device and for example includes at least one processor 62, memory 66, an input/output (I/O) 64 (e.g., one or more I/O interfaces and/or devices), and a communications pathway 67. In general, processor(s) 62 execute program code which is at least partially fixed in memory 66. While executing program code, processor(s) 62 can process data, which can result in reading and/or writing transformed data from/to memory and/or I/O 64 for further processing. The pathway 66 provides a communications link between each of the components in computing system 60. I/O 14 can comprise one or more human I/O devices, which enable a user to interact with computing system 60. Computing system 60 may also be implemented in a distributed manner such that different components reside in different physical locations.

Furthermore, it is understood that the data processing service or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computing system, comprising:
   a memory; and a processor configured to process flow data packets (FDPs) collected from a set of sensor devices, each installed in a toilet that collects a flow data packet (FDP) in response to a detected event from a fill tube in the toilet, wherein each FDP includes a sequence of flow rate values collected during the detected event, and wherein the processor is configured to:
   issue a first type of alert when the sequence in a current FDP includes more than a threshold number of data points;
   issue a second type of alert in response to a detected abnormal behavior of the current FDP relative to previously collected FDPs for a predetermined model of toilet; and
   issue a third type of alert based on a water usage for the toilet, wherein the water usage is based on a calculated flow rate for a toilet determined from at least one FDP, wherein the calculated flow rate is determined as a volume of the toilet divided by a time of the detected event, the time being determined from the at least one FDP.

2. The computing system of claim 1, wherein the detected abnormal behavior is determined from a set of rules.

3. The computing system of claim 1, wherein the detected abnormal behavior is determined by comparing the current FDP to a dynamically calculated signature that reflects a healthy behavior.

4. The computing system of claim 3, wherein the dynamically calculated signature is determined from a rolling window of previously collected FDPs.

5. The computing system of claim 4, wherein the previously collected FDPs are filtered to remove bad FDPs based on a confidence analysis process.

6. The computing system of claim 1, further comprising calculating a relative pressure of each detected event based on an associated FDP.

7. The computing system of claim 6, wherein the relative pressure for detected events associated with a set of toilets are utilized to generate a pressure node analysis.

8. The computing system of claim 7, wherein the pressure node analysis is applied to a mapping of at least one of a building floor, an entire building and a city block.

9. The computing system of claim 7, wherein the pressure node analysis is utilized to identify a leak between two toilets.

10. The computing system of claim 1, further comprising a dispatch system that dispatches alerts to a maintenance service.

11. A system, comprising:
    a set of sensor devices, each installed in an associated toilet that collect a flow data packet (FDP) in response to a detected event, wherein each FDP includes a sequence of flow rate values collected during the detected event; and
    a computing system that includes a memory and a processor configured to process flow data packets (FDPs) collected from the sensor devices, wherein the processor is configured to:
    issue a first type of alert when the sequence in a current FDP includes more than a threshold number of data points;
    issue a second type of alert in response to a detected abnormal behavior of the current FDP relative to previously collected FDPs for a predetermined model of toilet; and
    issue a third type of alert based on a water usage for the toilet, wherein the water usage is based on a calculated flow rate for a toilet determined from at least one FDP, wherein the calculated flow rate is determined as a volume of the toilet divided by a time of the detected event, the time being determined from the at least one FDP.

12. The system of claim 11, wherein the detected abnormal behavior is determined from a set of rules.

13. The system of claim 11, wherein the detected abnormal behavior is determined by comparing the current FDP to a dynamically calculated signature that reflects a healthy behavior.

14. The system of claim 13, wherein the dynamically calculated signature is determined from a rolling window of previously collected FDPs.

15. The system of claim 14, wherein the previously collected FDPs are filtered to remove bad FDPs based on a confidence analysis process.

16. The system of claim 11, further comprising calculating a relative pressure of each detected event based on an associated FDP.

17. The system of claim 16, wherein the relative pressure for detected events associated with a set of toilets are utilized to generate a pressure node analysis.

18. The system of claim 17, wherein the pressure node analysis is applied to a mapping of at least one of a building floor, an entire building and a city block.

19. The system of claim 17, wherein the pressure node analysis is utilized to identify a leak between two toilets.

20. The system of claim 11, further comprising a dispatch system that dispatches alerts to a maintenance service.

\* \* \* \* \*